US Patent 3,535,130
Patented Oct. 20, 1970

3,535,130
INTUMESCENT PAINTS

James E. Webb, Administrator of the National Aeronautics and Space Administration, with respect to an invention of John A. Parker, Los Altos, and George M. Fohlen, Millbrae, Calif.
No Drawing. Filed Feb. 9, 1968, Ser. No. 704,224
Int. Cl. C09d 5/18
U.S. Cl. 106—15
8 Claims

ABSTRACT OF THE DISCLOSURE

This invention relates to intumescent paints useful for fire protection. The intumescent material is an aromatic nitroamino compound in the form of its sulfate, either dissolved or dispersed in a vehicle, or prepolymerized, or both. Upon heating, such a paint intumesces, chars and provides a flame resistant coating.

---

The invention described herein was made in the performance of work under a NASA contract and is subject to the provisions of Section 305 of the National Aeronautics and Space Act of 1958, Public Law 85–568 (72 Stat. 435; 42 USC 2457).

This invention relates to intumescent paints which are intended for fire protection.

At present, paints are available which, when applied to a surface and then subjected to heat, will intumesce and expand. The expanded material, being of a porous heat insulating character, provides a degree of protection against heat transfer, flame, etc. However, previously available intumescent paints are unsatisfactory for several reasons, such as the following:

Conventional intumescent paints have very limited efficiency in applications of interest such as the protection of substrates under a 1/16″ steel plate or sheet. In a typical fuel fire, producing what is equivalent to radiative heating rates of 30,000 B.t.u. hr. ft.², the back face temperature rise of unprotected 1/16″ steel plate may be from 65° to 400° F. in as little as 20–30 seconds. The coatings resulting from application of the subject paints of this invention to this substrate in thickness of 50–60 mils require as much as 5 minutes to reach 400° F.

Conventional intumescent paints are usually sensitive to attack by water and other solvents. The subject paints of this invention are resistant to water immersion and to the action of jet fuel and similar flammable hydrocarbons.

Conventional intumescent coatings are not as resistant to scuffing and abrasion as are those of the present invention.

Chars resulting from thermal action on conventional intumescent coatings are usually sensitive to thermal erosion by flames. Chars formed by paints of the present invention are much more stable.

It is an object of the present invention to provide intumescent paints which are more effective than those heretofore available and which have one or more of the advantages indicated above.

The above and other objects of the invention will be apparent from the ensuing description and the appended claims.

In accordance with the invention, a certain class of polymerizable, intumescent material is employed, either in monomeric form or in partially polymerized form, such material being dispersed in a suitable vehicle if necessary.

In the preferred form of this embodiment of the invention, this active material is para-nitroaniline sulfate having the general formula

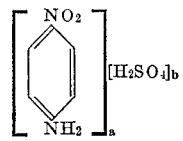

wherein $a$ and $b$ are molar proportions and are preferably both unity or near unity. Instead of sulfuric acid salts, sulfonic acid salts may be employed, e.g., the salts of benzene and toluene sulfonic acids. O-nitroaniline sulfate or sulfonate may also be used, as may the sulfates and sulfonates of other nitro amino aromatic compounds as explained hereinafter.

Hereinafter, for convenience, para-nitroanaline will be referred to as PNA.

The acid sulfate of PNA may be prepared in various ways. We have found it convenient merely to mix PNA in 98% sulphuric acid in the calculated amount with or without the use of a solvent. The preferred acid salt is the equimolar salt,

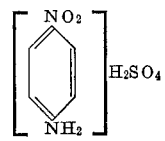

This salt is a powdery solid which is mentioned in Beilstein in vol. XII, page 715.

As a powdery solid, PNA sulfate requires a vehicle before it can be applied as a paint. Proper selection of a vehicle is important. We have found that cellulose nitrates of the grade commonly used for lacquers are good vehicles, such being dissolved in suitable solvents such as alcohols and ketones. The selected vehicle should be one which undergoes chemical decomposition without explosion at temperatures of about 150–200° C., or which is thermoplastic at such temperatures. In either case, the vehicle does not interfere with intumescence, as would a vehicle which remains rigid at such temperatures and therefore restrains intumescense.

A suitable example of a vehicle is a product available commercially as Parlodion (trademark of Mallinckrodt Chemical Works for a purified form of pyroxylin strips) and a suitable solvent for this vehicle is methyl ethyl ketone. Other similar cellulose nitrates and other similar solvents will be apparent to one skilled in the art of paints and lacquers.

In a typical formulation, 35 to 55 parts of PNA sulfate are dispersed in 5–10 parts of cellulose nitrate and the balance (q.s. to make 100 parts) of solvent.

Paints prepared in this manner are adherent to many types of surfaces, for example wood, paper, asbestos, aluminum, steel even when primed with zinc chromate. When a surface coated with such a paint is heated, as by fire, the paint intumesces to a very high degree. For example, a layer of such paint 0.055 inch thick will intumesce to a thickness of 1 to 1½ inches. In so doing, it forms a black polymer consisting of closed cells, having a high degree of heat resistance and thermal stability and having a low thermal conductivity. The volatile product of intumescence is for the most part water and sulfur dioxide, which act as good scavengers to sweep away oncoming hot gases and to suppress flames.

We believe that the reactions which occur during intumescence of the sulfate of PNA are inter-molecular condensation reactions involving the amino and nitro groups to link and condense rings and form new rings. The sulfuric acid is reduced to $SO_2$ during intumescence and becomes part of the volatile gases. The empirical formula of the black polymer formed at 240–250° C. is approximately $C_6H_3N_2OS_{0.3}$, indicating that C, H, N and O enter into ring and polymer formation. Excess PNA, if any, is lost in large part by violatilization.

The yield of char depends upon the time of heating, degree of flame exposure, etc. Yields of 25 to 55% are common. These chars are not very adherent to surfaces unless the surface has been primed, e.g., by means of an epoxy or polyurethane primer. The char has a closed cell structure, is thermally and oxidationally stable and has a density typically about 0.1 to 0.3 pound per cubic foot. As a result, the char has very low thermal conductivity. Intumescence begins about 220–240° C., the char continues to react and give off low molecular weight species ($SO_2$, water, $CO_2$, etc.) up to 500° C. The char is stable up to 1000° C.

Emphasis has been placed upon the sulfate of PNA; it is the preferred material. However, the sulfate (or sulfonate) or ortho nitroaniline and even meta-nitroaniline may be used although the meta compound does not intumesce as much as desired.

In general, sulfates and sulfonates of nitro amino aromatic compounds generally may be used where positions in ortho relation to the amino and nitro groups are open. Examples of such nitro amino aromatic compounds in addition to those mentioned above are the following:

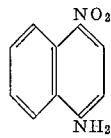  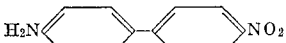

I 1-nitro-4-naphthyl-amine    II 4- amino-4'-nitro biphenyl

  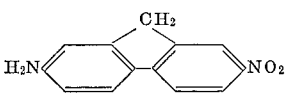

III 1,5-diamino-4,8-di-nitro naphthalene    IV 2-amino-7-nitro-fluorene

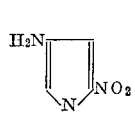  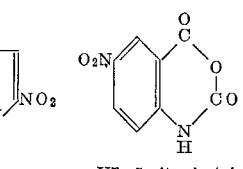

V 3-amino-5-nitro furan    VI 5-nitro-isatoic anhydride

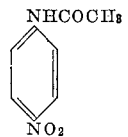

VII 4-nitro-acetanilide

It will be seen that the class of operable compounds includes carbocyclic and heterocyclic rings; that an ortho position may be occupied as in 5-nitro-isatoic anhydride, provided the ortho substituent is readily removed on heating (in this case, by expulsion of $CO_2$) and that the nitro and amino groups need not be in conventional p- or o- relation but may be separated by several carbon atoms. Thus in the compound 4-amino-4' nitrodiphenyl, the amino and nitro groups are separated by conjugated system and effectively in para relation to each other.

We have also discovered that the need for a vehicle such as cellulose nitrate may be dispensed with by carrying out a controlled prepolymerization of PNA sulfate (or a substitute) so that it is a viscous or solid material.

Thus we have discovered that it is possible to polymerize PNA sulfate to a solid material without causing intumescence and that the resulting solid of moderately low molecular weight (i.e., a low degree of polymerization) intumesces when heated above about 100–200° C. This solid, moreover, is soluble or dispersible in volatile solvents. Such solutions, dispersions and emulsions may be applied as paints.

The following examples will further illustrate the practice and advantages of the invention.

EXAMPLE I

A mixture of PNA sulfate prepared by reacting 239 grams of PNA with 171 grams of concentrated sulfuric acid is dispersed in a solution obtained by dissolving 60 grams of Parlodion in 285 grams of methyl ethyl ketone and 114 grams of ethyl alcohol. This mixture is ground in a pebble mill until a dispersion of 4–5 on the Hegemen scale is attained. A stable paint is then obtained, which may be sprayed, rolled or brush applied as a typical lacquer giving a wet film density of 1.10. After air drying, a film density in the range of 1.3 to 1.4 is obtained, with excellent abrasion resistance. The unpigmented coating is opaque and red-brown in color. To improve the coating's resistance to attack by $H_2O$, a top coating of the vehicle of the class used for the intumescent coating, e.g., cellulose nitrate, can be used. With the top coating, the paint is completely unaffected by water and fuel immersion.

When exposed to a temperature of about 250° C., this coating expands about 100 times volumetrically, and undegrees a change in density from 85 lb./cubic foot to 0.3 lb./cubic foot. A coating of about 50 mils when applied to $\frac{1}{16}$ steel plate and exposed to a jet fuel fire gave a back face temperature rise of 350° F. in about 4 minutes.

EXAMPLE II

To prepare a polymeric derivative of PNA acid sulfate, a mixture of 239 grams of p-nitroaniline and 171 grams of sulfuric acid is heated carefully to about 150° C. for 2 hours to give a dark viscous mass which can be admixed with solvents and short inorganic fibers such as glass or carbon or fillers. It can then be applied to give a suitable coating after air drying.

It will therefore be apparent that a new and useful intumescent paint has been provided.

We claim:
1. A composition of matter comprising:
   (a) 35–55 parts by weight of a material which undergoes intumescence upon heating,
   (b) 5–10 parts by weight of a cellulose nitrate vehicle, and
   (c) from 35–60 parts by weight of a lower alcohol or ketone solvent for components (a) and (b);
   said intumescent material being an acid salt of an aromatic nitro amino compound of the group consisting of the sulfuric acid salt, benzene sulfonic acid salt, or toluene sulfonic acid salt of para-nitroaniline, ortho - nitroaniline, 1 - nitro-4-naphthylamine, 4-amini - 4'-nitro - biphenyl, 1,5-diamino-4,8-dinitro naphthalene, 2 - amino-7-nitro-fluorene, 3-amino-5-nitro furan, 5-nitro-isatoic anhydride, or 4-nitro-acetanilide and mixtures of said salts.

2. The composition of claim 1 wherein the acid salt is the sulfuric acid salt of para-nitroaniline.

3. The composition of claim 1 wherein the acid salt is the benzene sulfonic acid salt of para-nitroaniline.

4. The composition of claim 1 wherein the acid salt is the toluene sulfonic acid salt of para-nitroaniline.

5. The composition of claim 1 wherein the solvent is methyl ethyl ketone.

6. A method of protecting a solid surface against fire and heat which comprises applying to the surface an adherent continuous coating comprising:
   (a) 35–55 parts by weight of an intumescent material which is an acid salt of an aromatic nitro amino compound of the group consisting of the sulfuric acid salt, benzene sulfonic acid salt, or toluene sulfonic acid salt of para-nitroaniline, ortho-nitroaniline, 1-nitro-4-naphthylamine, 4 - amino-4'-nitro - biphenyl, 1,5 - diamino - 4,8 - dinitro naphthalene, 2 - amino-7 - nitrofluorene, 3 - amino - 5 - nitro furan, 5-nitroisatoic anhydride, or 4-nitro-acetanilide, and mixtures of said salts, (b) 5–10 parts by weight of cellulose nitrate, and (c) from 35-60 parts by weight of ethyl alcohol-methyl ethyl ketone solvent.

7. The method of claim 6 wherein the acid salt is the sulfuric acid salt of para-nitroaniline.

8. The method of claim 6 wherein the acid salt is the benzene sulfonic acid salt of para-nitroaniline.

References Cited

UNITED STATES PATENTS

| 758,335 | 4/1904 | Schmidt | 106—195 |
|---|---|---|---|
| 1,315,216 | 9/1919 | Doerflinger | 106—195 |
| 2,208,640 | 7/1940 | McGill | 106—195 XR |
| 3,131,071 | 4/1964 | Hunter et al. | 106—15 |

FOREIGN PATENTS 963,674  4/1957  Germany.

JULIUS FROME, Primary Examiner

L. B. HAYES, Assistant Examiner

U.S. Cl. X.R.

106—186, 195; 117—136; 252—8.1